US008265682B2

(12) United States Patent
Bertrand et al.

(10) Patent No.: US 8,265,682 B2
(45) Date of Patent: Sep. 11, 2012

(54) SCHEDULING REQUEST USAGE IN DRX MODE IN WIRELESS NETWORKS

(75) Inventors: Pierre Bertrand, Antibes (FR); Jing Jiang, Allen, TX (US); Zukang Shen, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1101 days.

(21) Appl. No.: 12/050,382

(22) Filed: Mar. 18, 2008

(65) Prior Publication Data

US 2009/0239568 A1  Sep. 24, 2009

(51) Int. Cl.
*H04B 7/00* (2006.01)
(52) U.S. Cl. .................. 455/522; 370/318
(58) Field of Classification Search .......... 455/522, 455/450, 456.5, 509, 574, 127.5, 69; 370/328–329, 370/318
See application file for complete search history.

(56) References Cited

U.S. PATENT DOCUMENTS

| 7,957,360 B2* | 6/2011 | Suzuki et al. | 370/341 |
| 8,195,164 B2* | 6/2012 | Kazmi | 455/436 |
| 2007/0291729 A1* | 12/2007 | Dalsgaard et al. | 370/347 |
| 2008/0267105 A1* | 10/2008 | Wang et al. | 370/311 |
| 2009/0303927 A1* | 12/2009 | Kolding et al. | 370/328 |

OTHER PUBLICATIONS

3GPP, 3rd Generation Partnership Project;Technical Specification Group Radio Access Network; Evolved Universal Terrestrial Radio Access (E-UTRA); Physical Channels and Modulation; 3GPP TS 36.211, V8.1.0, Valbonne, France, Nov. 2007, pp. 1-54.
Texas Instruments, Synchronized Random Access structure and performance for E-UTRA, 3GPP TSG RAN WG1 LTE Ad Hoc, R1-061750, Agenda Item 4.1, Cannes, France, Jun. 27-30, 2006, pp. 1-13.
Texas Instruments, Contention-Free Preamble-Based Synchronized Random Access, 3GPP TSG RAN WG1 #47bis, R1-070259, Agenda Item 6.3.1, Sorrento, Italy, Jan. 15-19, 2007, pp. 1-6.
Nokia, Multiplexing for Dedicated Resource Request, 3GPP TSG Ran WG1 Meeting #47bis, R1-070379, Agenda Item 6.5.1, Sorrento, Italy, Jan. 15-19, 2007, pp. 1-3.
QUALCOMM Europe, UL Requests, 3GPP TSG-RAN WG1 #47bis, R1-070426, Agenda Item 6.5.1, Sorrento, Italy, Jan. 15-19, 2007, pp. 1-3.
QUALCOMM Europe, Further Details on RACH Procedure, 3GPP TSG-RAN WG1 #48, R1-070649, Agenda Item 6.5.1, St. Louis, Missouri USA, Feb. 12-16, 2007, pp. 1-4.

(Continued)

*Primary Examiner* — Nay A Maung
*Assistant Examiner* — Angelica Perez
(74) *Attorney, Agent, or Firm* — Robert D. Marshall, Jr.; Wade James Brady, III; Frederick J. Telecky, Jr.

(57) ABSTRACT

A cell within cellular network includes user equipment (UE) that transmits data to a base station (eNB). When a UE does not have data to transmit, it may enter a low power mode (DRX) having silent intervals during which the eNB does not expect to receive a transmission from the UE and the UE is not required to monitor DL control channels from the eNB. While in DRX mode, the UE may detect an event, such as data ready for transmission or a need to request a timing adjustment (TA) update. The UE transmits a scheduling request indicator (SRI) to the eNB in response to detection of the event, wherein the SRI carries information identifying the triggering event.

21 Claims, 9 Drawing Sheets

OTHER PUBLICATIONS

Texas Instruments, Interference between Data and Preamble-Based Scheduling Request in E-UTRAN, 3GPP TSG RAN WG1 #48, R1-070717, Agenda Item 6.5.1, St. Louis, Missouri USA, Feb. 12-16, 2007, pp. 1-6.

Texas Instruments, Preamble-Based Scheduling Request: Comparison with Other Solutions, 3GPP TSG RAN WG1 #48, R1-070718, Agenda Item 6.5.1, St. Louis, Missouri USA, Feb. 12-16, 2007, pp. 1-6.

Alcatel-Lucent, UL Reference Signals for Fast Uplink Scheduling Request, 3GPP TSG RAN WG1 #48, R1-071072, Agenda Item 6.9.1 (Uplink Control Signaling), St. Louis, Missouri USA, Feb. 12-16, 2007, pp. 1-2.

Texas Instruments, Scheduling Request and DRX, 3GPP TSG RAN WG1 #48bis, R1-071472, Agenda Item 7.4, St. Julians, Malta, Mar. 26-30, 2007, pp. 1-5.

Texas Instruments, UL Synchronization Management in LTE_ACTIVE, 3GPP TSG RAN WG1 #48bis, R1-071478, Agenda Item 71, St. Julians, Malta, Mar. 26-30, 2007, pp. 1-4.

Texas Instruments, On the need for UE-initiated Timing Adjustment Requests in E-UTRA, 3GPP TSG RAN WG1 #49bis, R1-072842, Agenda Item 5.8, Orlando, Florida USA, Jun. 25-29, 2007, pp. 1-3.

Texas Instruments, An Efficient Scheduling Request Channel for Wireless Networks, U.S. Appl. No. 11/866,912, filed Oct. 3, 2007.

Texas Instruments, Scheduling Request and DRX in E-UTRA, 3GPP TSG RAN WG I #49, R1-072194, Kobe, Japan, May 7-11, 2007.

Texas Instruments, UL Synchronization Management and Maintenance in E-UTRA, 3GPP TSG RAN WG I #49, RI-072198, Kobe, Japan, May 7-11, 2007.

Texas Instruments, Scheduling Request and DRX in E-UTRA, 3GPP TSG RAN WG1 #49bis, RI-072859, Orlando, USA, Jun. 25-29, 2007.

Texas Instruments, Uplink Synchronization Management in Wireless Networks, European Patent Application No. 06291535.0, filed Sep. 27, 2006, U.S. Appl. No. 11/858,860, filed Sep. 20, 2007, pp. 22.

* cited by examiner

SCHEDULING REQUEST USAGE IN DRX MODE IN WIRELESS NETWORKS

FIELD OF THE INVENTION

This invention generally relates to wireless cellular communication, and in particular to use of a contention-free scheduling request channel in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted information in the uplink, indicating successful or failed circular redundancy check(s) (CRC). Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACKNACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operation of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Each user device, also referred to as user equipment (UE), in the uplink synchronized state is allocated uplink resources of a base-station and is assigned, on top of its radio resource control/medium access control (RRC/MAC) 16-bit identifier (C-RNTI), a unique uplink physical layer identifier to temporarily ensure non-contentious uplink transmissions via a shared communication channel or a scheduling request channel. The group of user devices in the uplink non-synchronized state are not assigned any additional physical layer identifier and thus the total number of bits needed for the uplink physical layer identifier in the uplink synchronized state can be reduced to improve efficiency of the control signaling scheme. In at least some embodiments, each user device in the uplink non-synchronized state cannot send uplink transmissions until successfully requesting uplink resources and uplink synchronization from the base-station. The uplink synchronized state is hereafter referred to as a "synchronized state" and the uplink non-synchronized state is hereafter referred to as a "non-synchronized state". Also, the unique uplink physical layer identifier is hereafter referred to as a "reduced identifier" or a "unique identifier". Thus, it should be noted that embodiments described by these terms are not limited to uplink synchronization or to unique uplink physical layer identifiers.

In at least some embodiments, the assignment of user devices into the synchronized state and the non-synchronized state is temporary. For example, upon a successful request for uplink resources (also referred to as uplink scheduling grant), a non-synchronized user device can be reassigned to the synchronized state and receives a reduced identifier to enable uplink transmissions and contention-free scheduling requests. On the other hand, if more than a threshold amount of time passes without an uplink transmission or a timing adjustment (TA) command from the base-station, a user device in the synchronized state can be reassigned to the non-synchronized state and the reduced identifier corresponding to the reassigned user device is released. The reduced identifier can be of any form e.g. explicit, or also implicit in the form of a unique physical resource on the contention-free scheduling request channel.

A scheduling request indicator (SRI) is generally used by UEs that are UL synchronized, have no scheduling grants, and need to send a scheduling request in order to be granted resources for use in transmitting data or control information e.g. event-triggered measurements. The SRI channel signals a scheduling request need and potentially provides some preliminary information but does not give the details of the scheduling request content which is included in the scheduling request (SR) message on PUSCH.

UL synchronization maintenance is generally performed through the regular UL scheduled transmissions for UEs with scheduling grants, periodically assigned reference signals such as sounding reference signals (SRS), or through the non-synchronous random access (RACH) mechanism for UEs without scheduling grants.

When a UE does not have signal and/or channel that need to be received or transmitted, it can go into a low power mode referred to as discontinuous reception (DRX) and discontinuous transmission (DTX) respectively. New generation networks employ Hybrid Automatic Retransmission request (HARQ) mechanism which requires that downlink and uplink data transmissions are acknowledged by uplink and downlink HARQ Indicators (HI) respectively. As a result, any uplink activity implies downlink activity as well, and vice versa. Therefore, DRX and DTX are coupled in practice and, without loss of generality, are referred to as DRX mode. In this mode, specific intervals are defined in which a transmission is performed to maintain synchronization and/or report periodic requested control status (e.g. periodic measurement reports), but the UE does not perform any transmissions during defined silent intervals. The length of the silent interval may be configured based on the overall activity of the UE. It has now been determined that it can be useful to detect certain events that occur while the UE is in DRX mode and then transmit a scheduling request indicator (SRI) that is encoded with one or more bits of information to indicate what type of event was detected. This can be in response to various events, such as data becoming available for transmission, for requesting a timing adjustment when a measurement exceeds a threshold in order to maintain synchronization, etc. The timing and structure of the encoded SRI will be described in more detail below.

Figure 1:
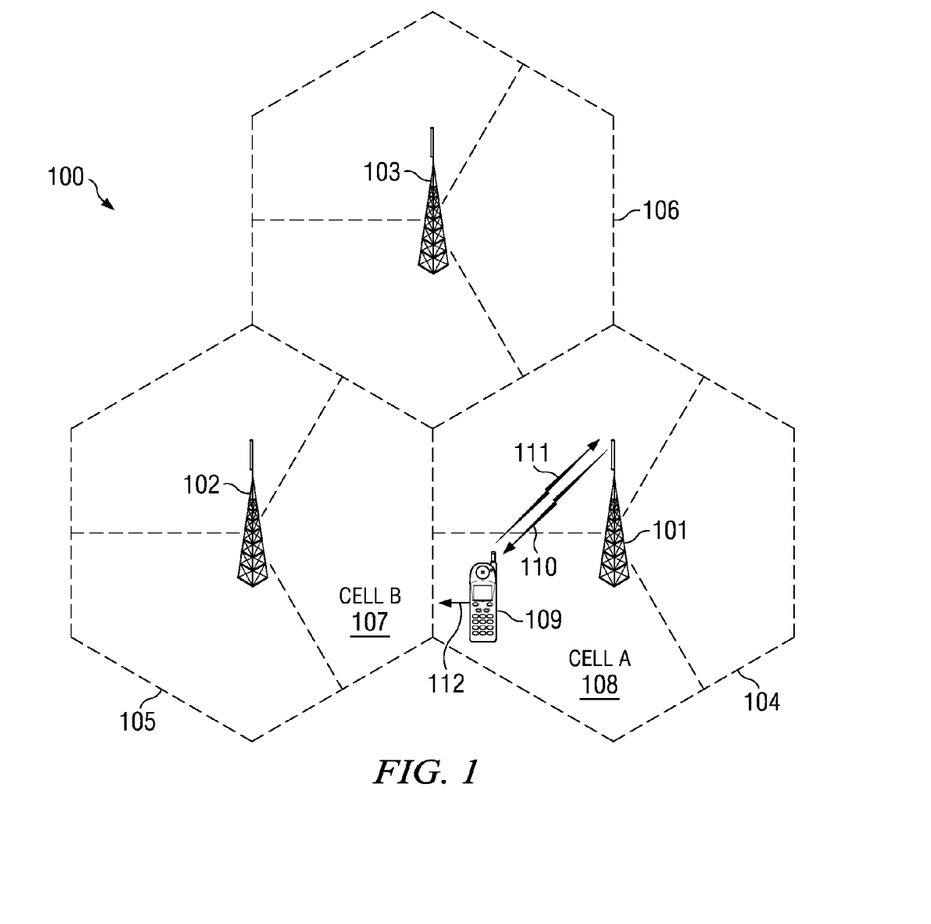
FIG. 1 is a pictorial of an illustrative telecommunications network that supports transmission of an encoded Scheduling Request Indicator (SRI)

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be handed over to base station 102. Because UE 109 is synchronized with base station 101, UE 109 must employ non-synchronized random access to initiate handover to base station 102.

While still in cell A 108, UE 109 also employs synchronous scheduling requests to request allocation of up-link 111 time or frequency or code resources. If UE 109 has data ready for transmission, for example, traffic data, measurements report, tracking area update, etc., UE 109 can transmit a scheduling request indicator signal on up-link 111. As will be described in more detail below, the SRI may be encoded with information to indicate why it is being transmitted. If the encoded SRI is in response to data ready to transmit, the SRI notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by base station 101, UE 109 (possibly) adjusts its transmit timing and transmits the data on up-link 111 employing the allotted resources during the prescribed time interval.

Figure 2:
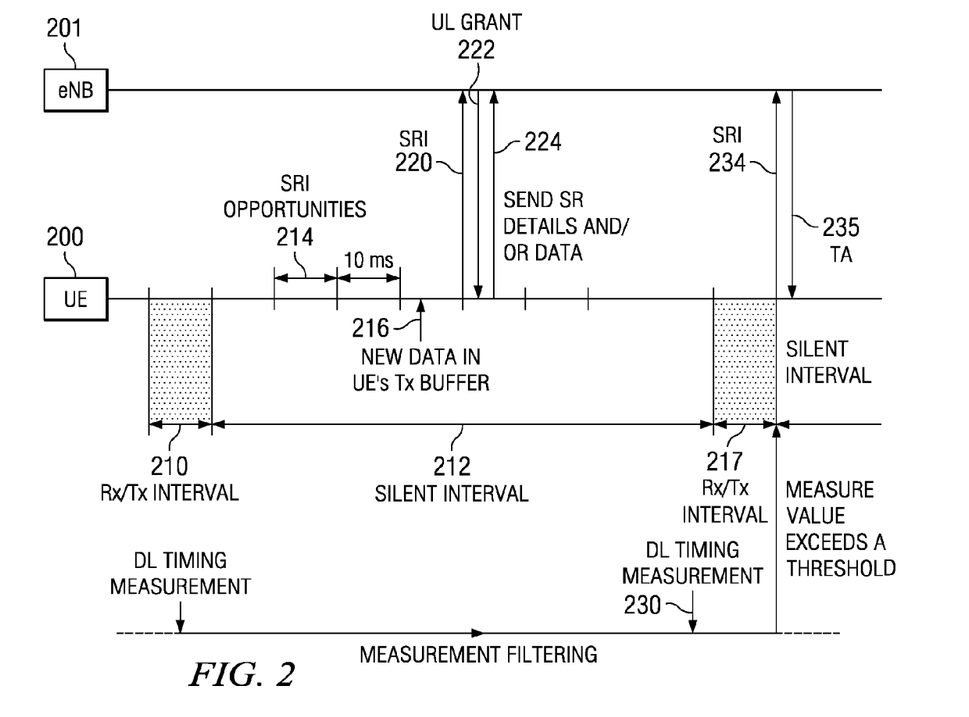
FIG. 2 is a timeline illustrating SRI usage in DRX mode in the telecommunication network of FIG. 1, with event identification information piggy-backed on the SRI.

FIG. 2 is a timeline illustrating Scheduling Request Indicator (SRI) usage in DRX mode between UE 200 and eNB 201. As discussed above, if a UE does not have a need to transmit or receive signals or channels for a period of time, it can enter a DRX mode in which the UE only monitors downlink signals or channels from the eNB during brief Rx/Tx intervals 210. The UE can use these Rx/Tx intervals to perform downlink measurements from the serving eNB and/or the neighboring eNBs. The rest of the time is considered as a silent interval 212 in which the UE is not expected to listen to downlink transmissions from the eNB, and the UE has no uplink resource grant, so that the UE turns off its receiver and transmitter and goes into sleep mode. While UE 200 remains in a synchronized state with the eNB, it will still have scheduled times 214 for sending an SRI, but ordinarily would not use them during silent interval 212.

Data may become available for transmission during a silent interval and be placed in a transmit (Tx) buffer, as indicated at 216. This data may appear at anytime during the silent interval, not just as indicated. Traditionally, the data would be held in the Tx buffer until the next agreed upon Rx/Tx interval, which in this case would be Rx/Tx interval 217. Then, an SRI would be sent to the eNB and an uplink resource would be allocated by the eNB for transmission of the data on the PUSCH.

However, it may be useful to allow the UE to break the agreed upon silent interval if the data is particularly important or time sensitive. In this case, an SRI would be transmitted to the eNB at the next SRI opportunity within the silent interval, which in the illustration is indicated at 220. The eNB then responds on the physical downlink control channel (PDCCH) with an uplink (UL) grant 222 that specifies what resource block(s), modulation and coding scheme (MCS) the UE shall use. The UE then sends the scheduling request (SR) details and/or the data 224 using the allocated resource block(s). Indeed, since the eNB does not know a-priori the exact resource needs of the UE, it will allocate a standard UL grant 222, which may or may not be sufficient to convey all new UE's data. In the latter case, the UE will use this grant to provide more details on its resource needs and, if there is some room left in the allocation, will join a first chunk of data.

In this embodiment, UEs in DRX mode maintain their DL synchronization during selected Rx periods 210 (e.g. one every n) at DRX interval boundaries and send a request for timing adjustment (TA) to the eNB only when the synchronization loss observed in downlink channel and/or RS exceeds a pre-defined timing error threshold, as indicated at 230. Thus, the UE only sends "on demand" TA update requests, resulting in saving a large amount of UL resources. Indeed, regardless the DRX interval length, the eNB cannot predict UE timing variations due to (major) changes in the delay profile or UE motion. As a result, if it was to allocate UL resources such as a sounding reference signal (SRS) in the aim of maintaining UL synchronization of DRX UEs, it would necessarily need to over-provision these resources. Instead, the UE can use the SRI to send the TA update request as indicated at 234. An SRI opportunity may not occur at the DRX interval boundary, so the UE waits for the next SRI opportunity. Note though that, since SRIs are expected to be scheduled every 10 ms, it should be easy to monitor DRX intervals so that DRX boundaries coincide with SRI opportunities.

In this embodiment, the SRI is sent along with a contention-based wideband reference signal (WB RS) which provides sufficient accuracy for TA estimation, so that a TA 235 can be sent to the UE in response to SRI 234. Since the primary goal of the SRI is to allocate UL resources to the UE, the eNB before had no way to know that the UE only requests a TA update, and would therefore always allocate some UL resource upon SRI reception. It has been determined that the UE capacity of e.g. a preamble-based SR is 512 per 5 MHz, as will be described in more detail below. However, if one bit information can be carried on the SRI, this information bit can identify whether the UE only requires a TA update or if it also needs UL resources. As shown in FIG. 2, SRI 220 is encoded to indicate a need for a UL grant 222 while SRI 234 is encoded to indicate only a need for a TA update 235.

Figure 3A:
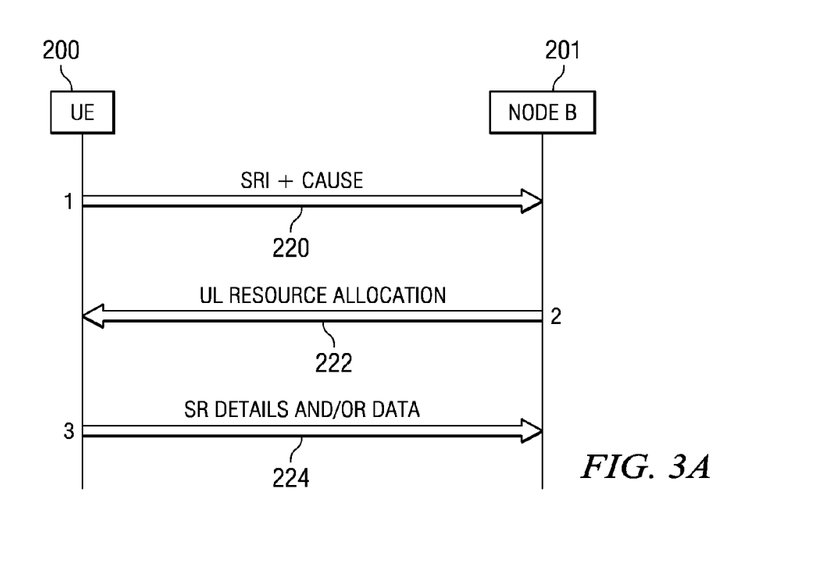
FIGS. 3A, 3B, and 3C are ladder diagrams illustrating the enhanced scheduling request procedure of FIG. 2.
Figure 3B:
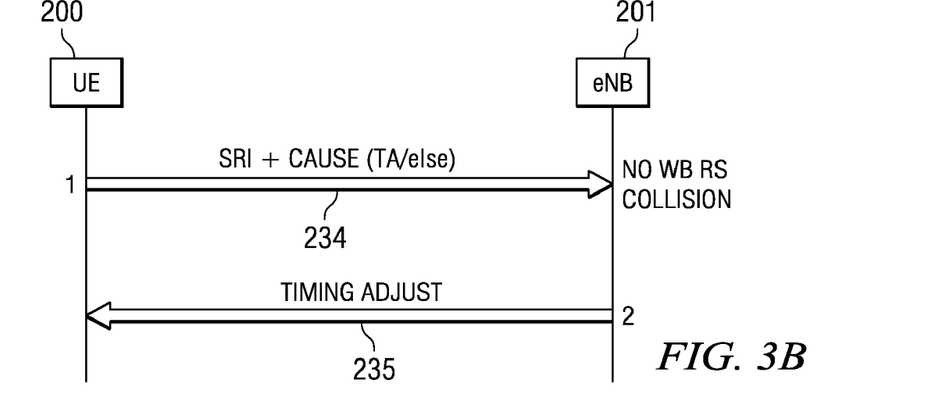
Figure 3C:
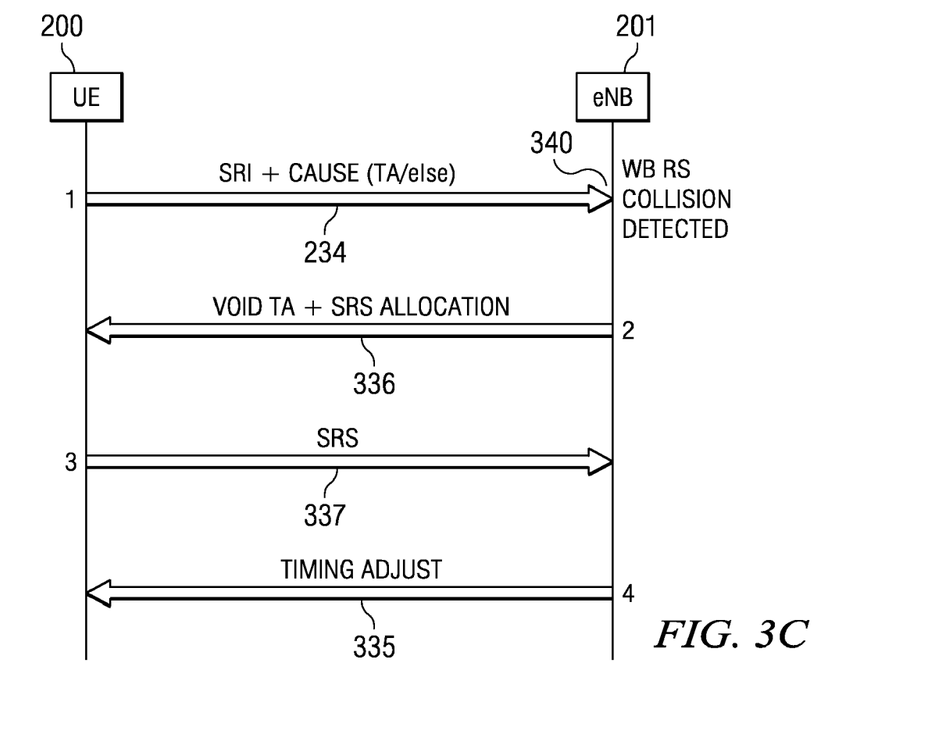

FIG. 3A is a ladder diagram illustrating this enhanced scheduling request procedure in support of a data transfer. As mentioned above, SRI 220 is encoded to indicate a need for an UL grant. eNB 201 then responds on the physical downlink control channel (PDCCH) with an uplink (UL) grant 222 that specifies what resource block(s), modulation and coding scheme (MCS) the UE shall use. The UE then sends the scheduling request (SR) details and/or the data 224 using the allocated resource block(s). Indeed, since the eNB does not know a-priori the exact resource needs of the UE, it will allocate a standard UL grant 222, which may or may not be sufficient to convey all new UE's data. In the latter case, the UE will use this grant to provide more details on its resource needs and, if there is some room left in the allocation, will join a first chunk of data FIGS. 3B and 3C are ladder diagrams illustrating the enhanced scheduling request procedure in support of TA update requests in which information is piggybacked onto the SRI to indicate that a TA update is needed. In FIG. 3B, the SRI's WB RS does not collide with any other SRIs' WB RS, so that TA update 235 is provided in direct response to SRI 234 in a simple two step sequence.

FIG. 3C illustrates a collision 340 that is detected between SRI's WB RS 234 from UE 200 and another SRI's WB RS from another UE in the same cell that happens to be using a same WB RS resource. In this case, the eNB replies with a void TA message and provides an allocation of dedicated resources for sending sounding reference signal (SRS) 337 to enable the TA estimation by eNB. The eNB then responds with TA update 335.

In another embodiment, UEs in DRX mode are requested to report event-triggered measurements in support of handover and/or power control or any other Medium Access Control (MAC) or physical layer procedure. These measurements are permanently maintained by the UE but are reported only when exceeding a pre-configured threshold, thus saving significant UL overhead, compared to periodic reports. As a result, the eNB has no a-priori knowledge of the transmission time of a UE's event-triggered measurement report, which can only be conveyed by the scheduling request procedure.

Figure 4A:
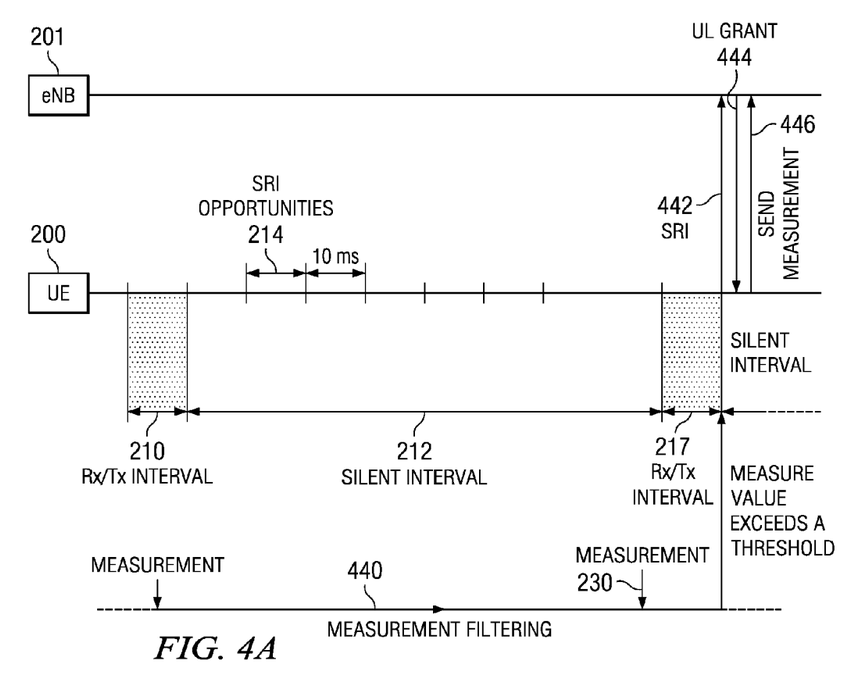
FIGS. 4A and 4B are timelines illustrating SRI usage in DRX mode for sending measurement reports using event identification information piggy-backed on the SRI.
Figure 4B:
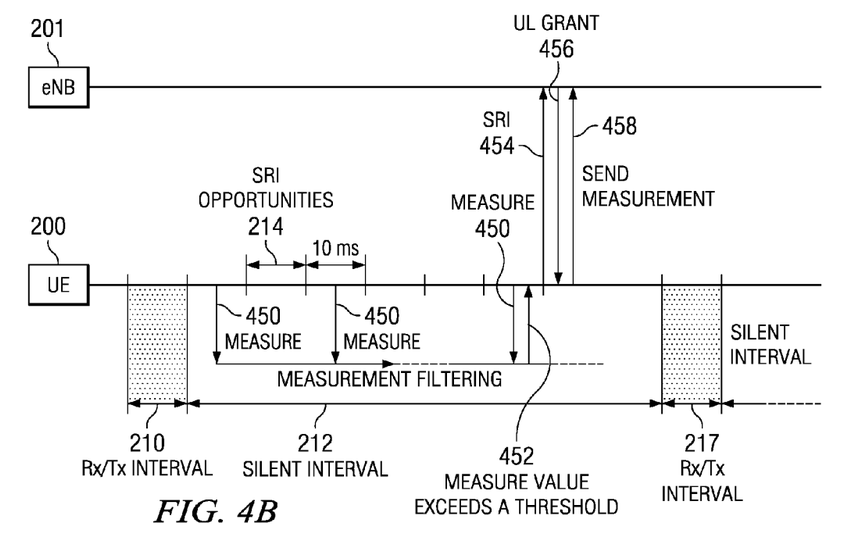

FIGS. 4A and 4B are timelines illustrating SRI usage in DRX mode for sending measurement reports using event identification information piggy-backed on the SRI. FIG. 4A illustrates the case where the power saving prevails over measurement reports latency, and the UE does not monitor any downlink signal or channel during the silent periods. As a result, measurements are only performed during the Rx/Tx intervals 210, 217. Measurements can be filtered 440 over several instances. Whenever the measurement result exceeds a pre-configured reporting threshold, the UE autonomously transmits the measurement report through the enhanced SR procedure: it sends the SRI 442 with piggy-backed data indicating a measurement report needs to be sent, at the reception of which eNB 201 allocates UL grant 444 for the measurement report. UE 200 then transmits measurement report 446 using the resources defined in UL grant 444. Unlike data transmission, the maximum size of a measurement report is known by the eNB. As a result, if it knows that the SRI triggering event is a measurement report, the eNB can allocate the appropriate amount of uplink resource in the uplink grant 235, thus avoiding any over-provisioning. Therefore, in another embodiment, the SRI coded information can be defined to allow the eNB to distinguish between an SRI triggered by a measurement report of by new data in the buffer.

FIG. 4B illustrates the case where measurement reports latency prevails over power saving, and the UE does monitor downlink signals or channels during the sub-intervals of the silent periods as indicated in general at 450. This may be performed every sub-interval, or at a lower rate such as every third subinterval, for example. As a result, similarly to the SRI triggered by new data in the Tx buffer, the SRI can be triggered by an event-triggered measurement report during a silent interval of DRX operation. Whenever the measurement result exceeds a pre-configured reporting threshold, the UE autonomously transmits the measurement report through the enhanced SR procedure: it sends SRI 454 with piggy-backed data indicating a measurement report needs to be sent, at the reception of which eNB 201 allocates UL grant 456 for the measurement report. UE 200 then transmits measurement report 458 using the resources defined in UL grant 456. As discussed with reference to FIG. 4A, the maximum size of a measurement report is known by the eNB. As a result of receiving the piggy-back information in the SRI indicating a measurement report is to be sent, the eNB can allocate the appropriate amount of uplink resource in the uplink grant 456, thus avoiding any over-provisioning.

Since it is likely to reflect a return to activity, an SRI transmission in DRX mode ordinarily automatically triggers the UE's exit of DRX mode. However, in some cases such as non time-critical measurement reports or sporadic transmission of small amount of data such as web browsing, the UE can get back to DRX right after its data transmission. Therefore, in another embodiment, the SRI coded information can be defined to allow the eNB to distinguish DRX status between a UE exiting the DRX mode after the SR procedure or remaining in DRX mode after the SR procedure.

In another embodiment, the SRI coded information can be defined to indicate to the eNB the size, among a pre-defined set, of the uplink resource to allocate upon SRI reception.

ON-OFF SRI with Piggy-Backed Information

The SRI transmission scheme allowing piggy-backing of one or two bits of information on the SRI is a modification of the regular on-off transmission scheme. In the absence of any SRI triggering event at a given SRI resource, the UE sends DTX (i.e. does not send anything) on its SRI resource. However, in the presence of an SRI triggering event at a given SRI resource window, the UE sends an SRI signal on its SRI resource which carries some basic piggy-backed information.

Figure 5:
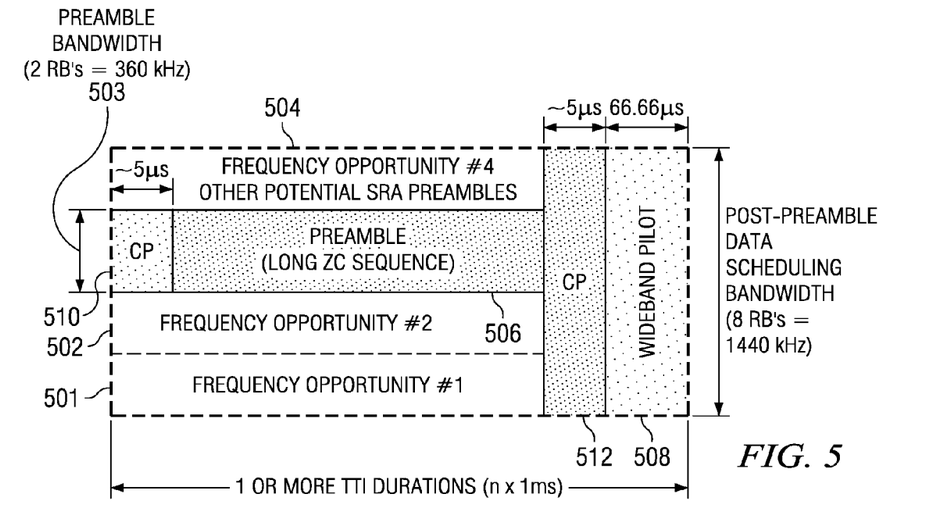
FIG. 5 illustrates a structure for an SRI with a preamble format for use in DRX mode.
Figure 6A:
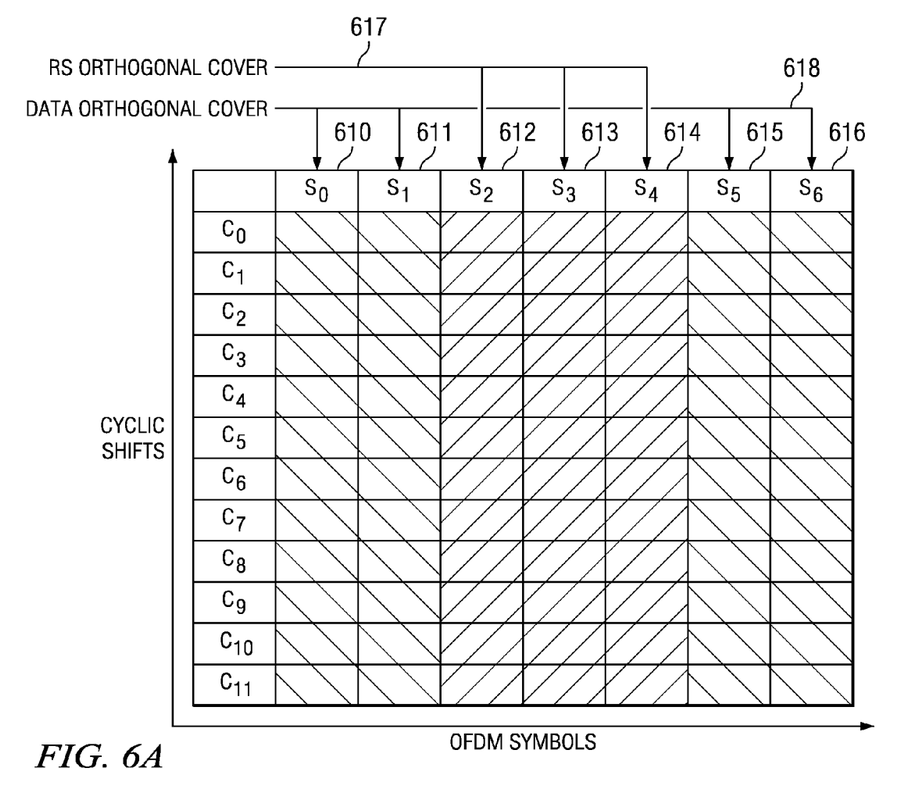
FIGS. 6A and 6B illustrate alternative coherent SRI structures for use in DRX mode.
Figure 6B:
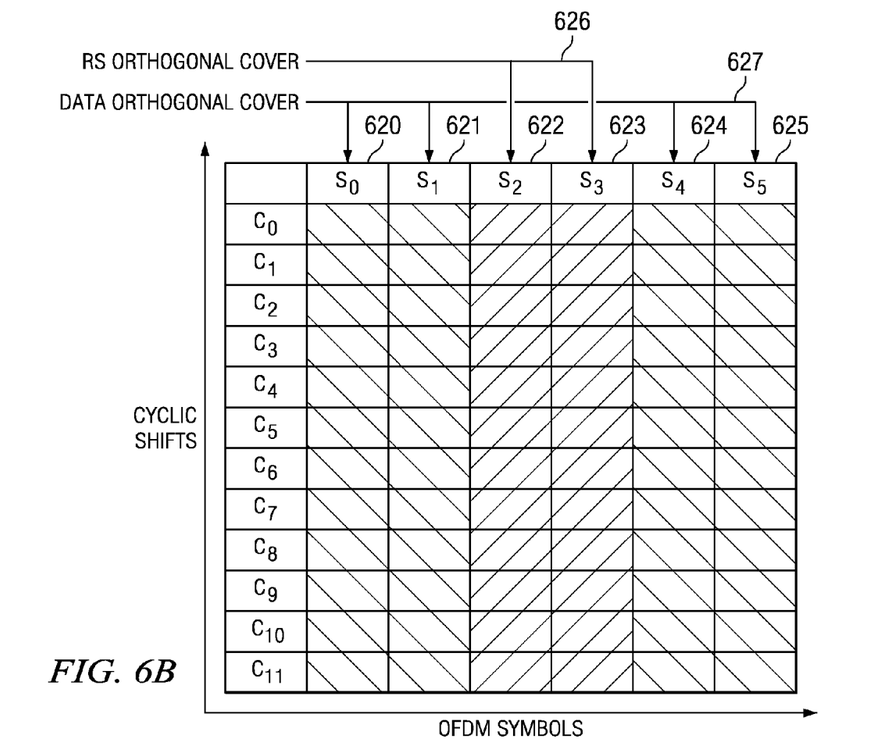

Various embodiments may use different SRI structures to implement the On-Off SRI with piggy-backed information; for example, a preamble (non-coherent) structure or a coherent structure. FIG. 5 illustrates a preamble based non-coherent structure where the piggy-backed information is conveyed by defining signature sets selected by the UE based on the information to piggy back. FIGS. 6A and 6B illustrate coherent SRI structures where the piggy-back information is conveyed using BPSK or QPSK modulation.

FIG. 5 illustrates a structure for an SRI with a preamble format for use in DRX mode. It is made of four frequency blocks 501-504, which provide four orthogonal resource opportunities for transmitting a preamble. FIG. 5 illustrates an example where a preamble 506 is transmitted in frequency opportunity #3 503. The size of each frequency block is two resource blocks (RB), which, in one embodiment corresponds to 360 kHz. Thus, the total bandwidth allocated to an SRI slot is eight RB's=1.44 MHz. The preamble is followed by a wideband pilot 508, also referred to as wideband reference signal (WB RS), that spans the whole SRI slot bandwidth, 1.44 MHz. With such a structure, a three-step procedure is used to transmit the scheduling request, where the second step is the scheduling request response from the eNB to the UE and the third step is scheduled on the PUSCH as described above when data is ready for transmission. In one embodiment, this first post-preamble scheduled UL transmission is frequency scheduled in a localized manner within the same bandwidth as that occupied by the SRI wideband pilot.

Therefore, the wideband pilot 508 provides means for channel sounding to the frequency scheduler. Multiplexing pilots of multiple received preambles will be discussed in more detail below. Both preamble 506 and wideband pilot 508 have a respective cyclic prefix (CP) 510, 512 so as to guarantee the signal's orthogonality in the frequency domain while enabling a simple frequency domain detection method. The total length of CP1 510 and CP2 512 is set to approximately 5 μs, to cope with a conservative delay spread duration encountered in urban environments, for 1 ms SRI slot duration, but the individual length of each depends on the system bandwidth as it is required that the wideband RS OFDM symbol be time-aligned with the last OFDM symbol in each data TTI on PUSCH. Therefore, there is no interference between the wideband RS and data.

In this embodiment, the SRI slot is scheduled every 10 ms, so as to keep the average waiting time of a scheduling request to 5 ms.

Preamble Sequence

The preamble sequence is a long constant amplitude zero autocorrelation (CAZAC) complex sequence allocated to the UE among a set of $R_s$ possible sequences. These sequences are built from cyclic shifts of a CAZAC root sequence. If additional sequences are needed, then they are derived from cyclic shifts of other CAZAC root sequences.

Well known examples of CAZAC sequences include, but are not limited to: Chu Sequences, Frank-Zadoff Sequences, Zadoff-Chu (ZC) Sequences, and Generalized Chirp-Like (GCL) Sequences. A known set of sequences with CAZAC property is the Zadoff-Chu N-length sequences defined as follows $$a_k = \exp\left[j2\pi \frac{M}{N}\left(\frac{k(k+1)}{2} + qk\right)\right] \quad (1)$$

where M is relatively prime to N, N odd, and q any integer.

The latter constraint on N also guarantees the lowest and constant-magnitude cross-correlation $\sqrt{N}$ between N-length sequences with different values of M: $M_1$, $M_2$ such that ($M_1 - M_2$) is relatively prime to N. As a result, choosing N a prime number always guarantees this property for all values of M<N, and therefore maximizes the set of additional sequences, non orthogonal, but with optimal cross-correlation property. On top of providing additional sequences for a UE to chose among in a given cell, these sequences are also intended to be used in neighboring cells, so as to provide good inter-cell interference mitigation.

General operation of the preamble based scheduling request (SR) used in this embodiment is described in more detail in U.S. patent application Ser. No. 11/866,912, filed 3 Oct. 2007 entitled "An Efficient Scheduling Request Channel for Wireless Networks" which is incorporated herein in its entirety.

As described above, information can be piggy-backed (encoded) onto the preamble based SRI by use of different sets of sequences to represent the data. For example, use of a first set of sequences would indicate a "normal" SRI in which resource scheduled is requested. A second set of sequences would indicate that only a TA update is requested. Additional set of sequences can be agreed upon to indicate other event types that may be detected, a list of which is given above as an example.

FIGS. 6A and 6B illustrate alternative coherent SRI structures for use in DRX mode. These structures re-use the structure specified in E-UTRA specifications for standalone ACK/

NACK transmission on PUCCH. FIG. 6A illustrates one slot of a transmission frame in which short cyclic protection (CP) sequences are used, where $c_0$-$c_{11}$ represent the cyclic shifts of a CAZAC sequence, and $s_0$-$s_6$ represent seven OFDM symbols per slot (0.5 ms). Without loss generality, the middle three OFDM symbols 612-614 are assumed to carry the reference signal (RS) for coherence demodulation, while the other four OFDM symbols 610, 611, 615 and 616 carry the SRI information. Orthogonal covering 617 and 618 is applied to the RS OFDM symbols and the SRI bearing OFDM symbols, respectively. The SRI bearing OFDM symbols are binary phase shift key (BPSK) or quadrature phase shift key (QPSK) modulated when the piggy-backed SRI information is one or two bits wide, respectively.

Similarly, FIG. 6B illustrates one slot of a transmission frame in which long cyclic protection (CP) sequences are used and therefore only six symbols 620-625 are available per slot. The middle two OFDM symbols 622-623 are assumed to carry the reference signal (RS) for coherence demodulation, while the other four OFDM symbols 620, 621, 624 and 625 carry the SRI information. Orthogonal covering 626 and 627 is applied to the RS OFDM symbols and the SRI bearing OFDM symbols, respectively. The SRI bearing OFDM symbols are BPSK or QPSK modulated when the piggy-backed SRI information is one or two bits wide, respectively.

Figure 7:
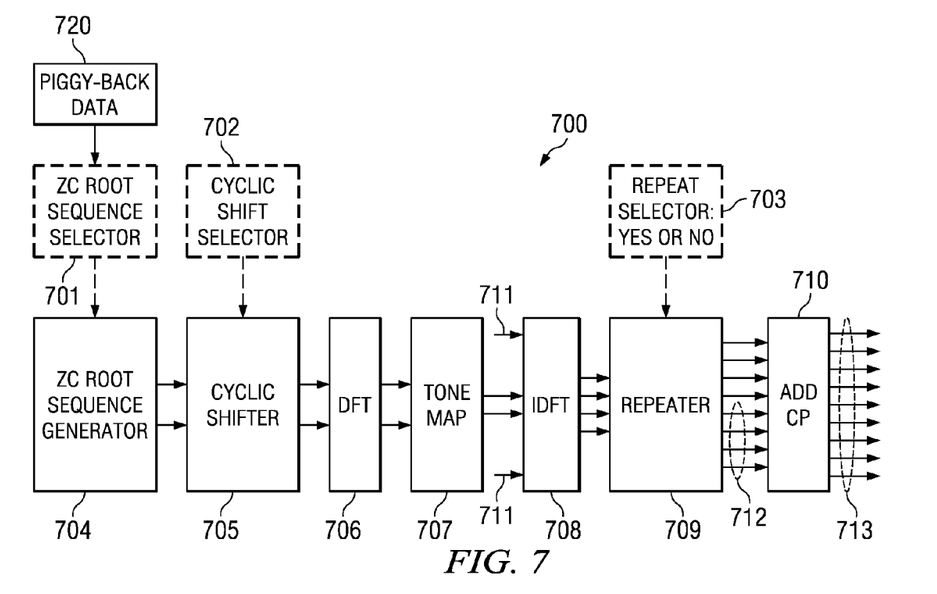
FIG. 7 is a block diagram of an illustrative transmitter for transmitting the SRI structure of FIG. 5.

FIG. 7 is a block diagram of an illustrative transmitter 700 for transmitting the preamble structure of FIG. 5. Elements of the transmitter may be implemented as components in a fixed or programmable processor by executing instructions stored in memory. Transmitter 700 is used to select and perform the preamble signal transmission as follows. The UE performs selection of the CAZAC (e.g. ZC) root sequence using the ZC Root Sequence Selector 701 and the selection of the cyclic shift value using the Cyclic Shift Selector 702. Next, the UE generates the ZC sequence using the ZC Root Sequence Selector 704. Then, if necessary, the UE performs cyclic shifting of the selected ZC sequence using the Cyclic Shifter 705. The UE performs DFT (Discrete Fourier Transform) of the cyclically shifted ZC sequence in DFT 706. The result of the DFT operation is mapped onto a designated set of tones (sub-carriers) using the Tone Map 707. Additional signals or zero-padding 711 may or may not be present. The UE next performs IDFT of the mapped signal using the IDFT 708. The size of the IDFT in 708 may optionally be larger than the size of DFT in 706. The resultant symbol may be optionally repeated by repeater 709 under control of selector 703 to form repeated samples 712. A cyclic prefix is created and added in module 710 to form a final fully formed uplink signal 713.

In other embodiments, the order of cyclic shifter 705, DFT 706, tone map 707 and IDFT 708 may be arranged in various combinations. For example, in one embodiment a DFT operation is performed on a selected root sequence, tone mapping is then performed, an IDFT is performed on the mapped tones and then the cyclic shift may be performed. In another embodiment, tone mapping is performed on the root sequence and then an IDFT is performed on the mapped tones and then a cyclic shift is performed. In some embodiments, the IDFT block in 708 may be implemented using an Inverse Fast Fourier Transform (IFFT), and the DFT block in 706 may be implemented using a Fast Fourier Transform (FFT).

Encoded information is piggy-backed onto the preamble-based SRI by predefining various sets of ZC root sequences to represent bits of data, as discussed with reference to FIG. 5. Sequence selector 701 receives the data to be piggy-backed from event detector 720 and selects an appropriate set of sequences that has been pre-defined to represent the piggy-back data value.

Figure 8:
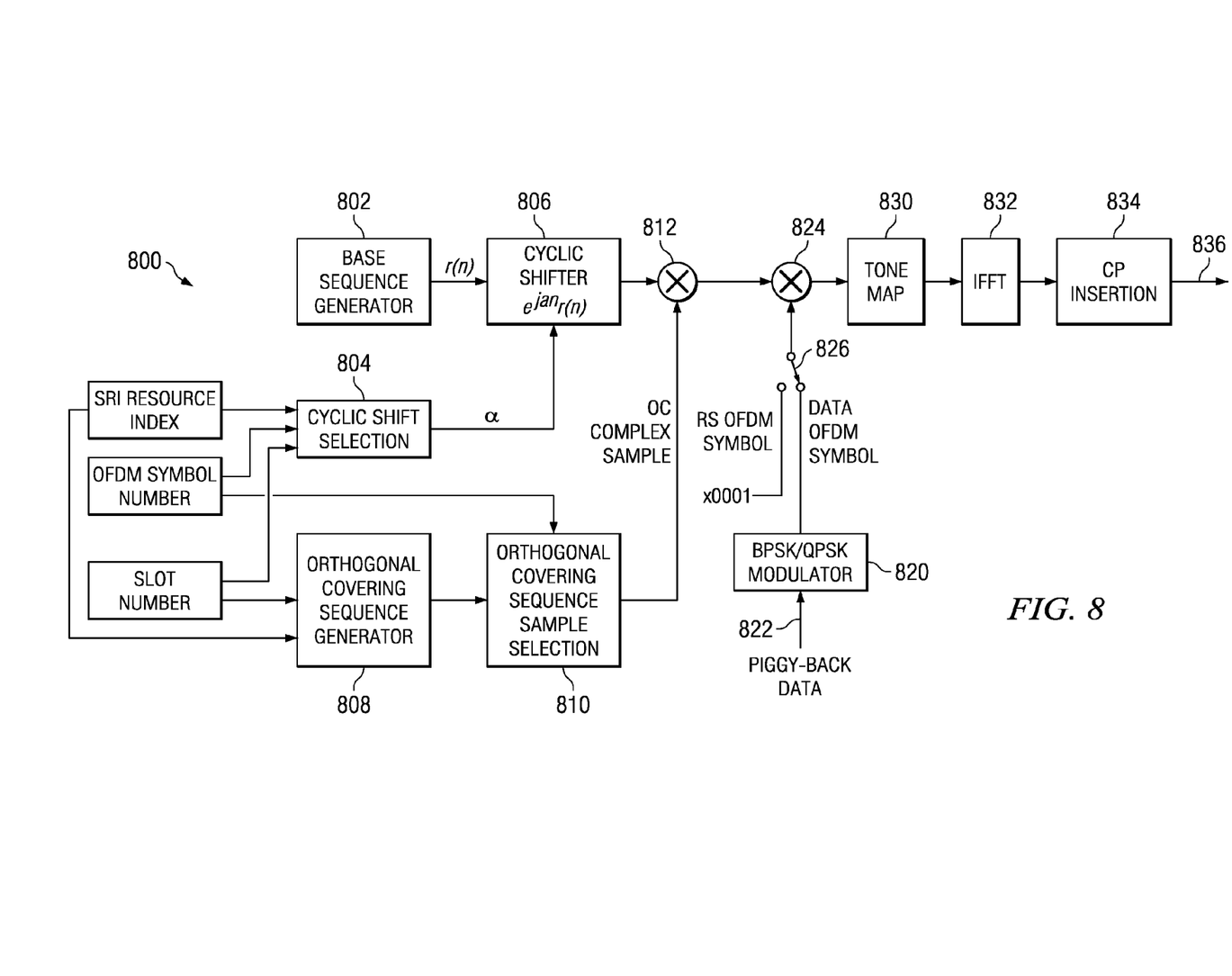
FIG. 8 is a block diagram of an illustrative transmitter for transmitting the coherent SRI structures of FIGS. 6A-6B.

FIG. 8 is a block diagram of an illustrative transmitter 800 for transmitting the coherent SRI structures of FIGS. 6A-6B. Elements of the transmitter may be implemented as components in a fixed or programmable processor by executing instructions stored in memory. The UE generates a CAZAC-like (e.g. ZC or extended ZC or zero-autocorrelation QPSK computer-generated) sequence using base sequence generator 802. A cyclic shift value is selected for each symbol based on the SRI resource index (in the SRI multiplex), the OFDM symbol number and the slot number in cyclic shift selecting module 804. The base sequence is then shifted by cyclic shifter 806 on a symbol by symbol basis using shift values provided by cyclic shift selection module 804.

The UE generates both RS and data orthogonal covering sequences 617 and 618 (or 626 and 627) using orthogonal sequence generator 808. The sequence length is equal to the number of covered OFDM symbols. The number of data OFDM symbols is four in both FIGS. 6A and 6B examples. Sequences used for this orthogonal covering are typically length-4 Walsh-Hadamard sequences, taken from the following set of sequences: $\{(1,1,1,1),(1,1,-1,-1),(1,-1,-1,1),(1,-1,1,-1)\}$. The number of RS OFDM symbols is three in FIG. 6A and two in FIG. 6B examples. Sequences used for this orthogonal covering are either length-2 Walsh-Hadamard sequences, taken from the following set of sequences: $\{(1,1),(1,-1)\}$ or length-3 DFT sequences taken from the following set of sequences: $\{(1,1,1),(1,e^{i2pi/3},e^{i4pi/3}),(1,e^{i4pi/3},e^{i8pi/3})\}$. Orthogonal sequence generator 808 generates one sequence out of the set of orthogonal sequences based on the SRI resource index (in the SRI multiplex).

The orthogonal covering sequence sample selection 810 selects and issues the appropriate sequence complex sample from the appropriate sequence (RS or data) based on the index of the OFDM symbol being currently generated.

The cyclic shifted base sequence vector is element-wise complex-multiplied by the selected orthogonal covering complex sample in complex multiplier 812.

The data that identifies a detected event is organized as either one or two bits in this embodiment and is input to modulator block 820. The SRI bearing OFDM symbols are binary phase shift key (BPSK) or quadrature phase shift key (QPSK) modulated when the piggy-backed SRI information is one or two bits wide, respectively. The switch 826 selects, based on the OFDM symbol type (data or RS), which of the modulation complex sample or "1" feeds the complex multiplier 824. In other words, as discussed with reference to FIGS. 6A and 6B, the event identification data is placed in the outer four modulated symbols of either a six or seven symbol slot via complex multiplier 824 and switch 826.

The result of the element-wise complex multiplication is mapped onto a designated set of tones (sub-carriers) using the Tone Map 830. The UE next performs IFFT of the mapped signal using the IFFT 832. A cyclic prefix is created and added in module 834 to form a final fully formed uplink signal 836.

Figure 9:
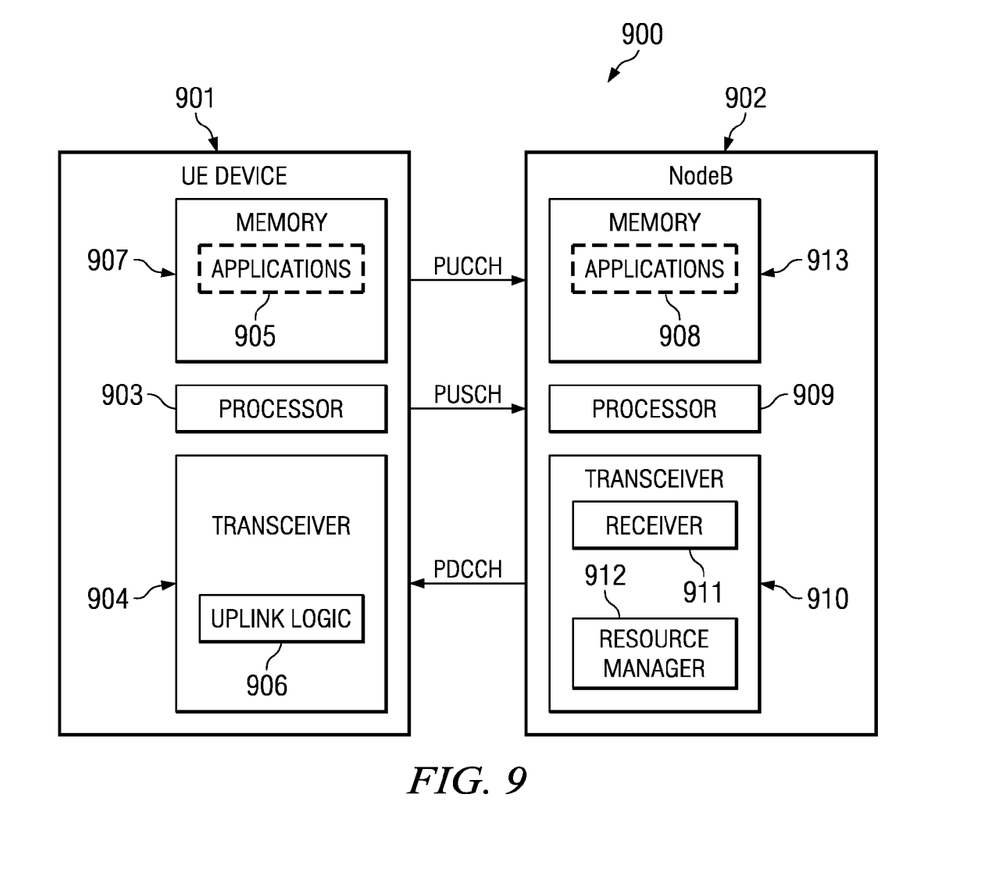
FIG. 9 is a block diagram of a Node B and a User Equipment for use in the network system of FIG. 1.

FIG. 9 is a block diagram illustrating operation of a eNB and a mobile UE in the network system of FIG. 1. As shown in FIG. 9, wireless networking system 900 comprises a mobile UE device 901 in communication with an eNB 902. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the eNB 902 based on a LTE or E-UTRAN protocol. Alternatively, another communication protocol now known or later developed can be used.

As shown, the mobile UE device 901 comprises a processor 903 coupled to a memory 907 and a Transceiver 904. The memory 907 stores (software) applications 905 for execution by the processor 903. The applications 905 could comprise any known or future application useful for individuals or organizations. As an example, such applications 905 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 905, at least some of the applications 905 may direct the mobile UE device 901 to transmit UL signals to the eNB (base-station) 902 periodically or continuously via the transceiver 904. In at least some embodiments, the mobile UE device 901 identifies a Quality of Service (QoS) requirement when requesting an uplink resource from the eNB 902. In some cases, the QoS requirement may be implicitly derived by the eNB 902 from the type of traffic supported by the mobile UE device 901. As an example, VOIP and gaming applications often involve low-latency uplink (UL) transmissions while High Throughput (HTP)/Hypertext Transmission Protocol (HTTP) traffic can involve high-latency uplink transmissions.

As shown in FIG. 9, the transceiver 904 comprises uplink logic 906. The uplink logic executes instructions that control the operation of the transceiver. Some of these instructions may be stored in memory 907 and executed when needed. When no data is expected for transmission, the uplink logic places the transceiver in a low power DRX mode. While in DRX mode, the uplink logic may detect an event that requires an SRI be sent to the eNB. As described above with reference to FIGS. 1-8, the uplink logic encodes the SRI with piggy-back data that tells the eNB the reason for sending the SRI while the UE device is in DRX mode. For example, low latency data may need to be transmitted, or a TA update may be needed to maintain synchronization with eNB 902. As would be understood by one of skill in the art, the components of the Uplink Logic 906 may involve the physical (PHY) layer and/or the Media Access Control (MAC) layer of the transceiver 904.

As shown in FIG. 9, the eNB 902 comprises a Processor 909 coupled to a memory 913 and a transceiver 910. The memory 913 stores applications 908 for execution by the processor 909. The applications 908 could comprise any known or future application useful for managing wireless communications. At least some of the applications 908 may direct the base-station to manage transmissions to or from the user device 901.

Transceiver 910 comprises an uplink Resource Manager 912, which enables the eNB 902 to selectively allocate uplink PUSCH resources to the user device 901. As would be understood by one of skill in the art, the components of the uplink resource manager 912 may involve the physical (PHY) layer and/or the Media Access Control (MAC) layer of the transceiver 910. Transceiver 910 includes a Receiver 911 for receiving transmissions from various UE within range of the eNB.

Uplink resource manager 912 executes instructions that control the operation of transceiver 910. Some of these instructions may be located in memory 913 and executed when needed. Resource manager 912 controls the transmission resources allocated to each UE that is being served by eNB 902 and broadcasts control information via the physical downlink control channel PDCCH. UE that are in DRX mode may ignore the downlink control information and the eNB does not expect to receive transmissions from a UE in DRX mode. However, if a UE in DRX mode transmits an SRI on the PUCCH, then resource manager 912 decodes information that is piggy-backed on the SRI to determine why the SRI was sent while the UE was in DRX mode and responds with a UL grant or with a TA in accordance with the type of event indicated by the piggy-back data. In some embodiments, the UL grant may be tailored to the event type in accordance with the type of event indicated by the piggy-back data. In another embodiment, the eNB will distinguish DRX status between a UE exiting the DRX mode after the SR procedure or remaining in DRX mode after the SR procedure in accordance with the type of event indicated by the piggy-back data.

Figure 10:
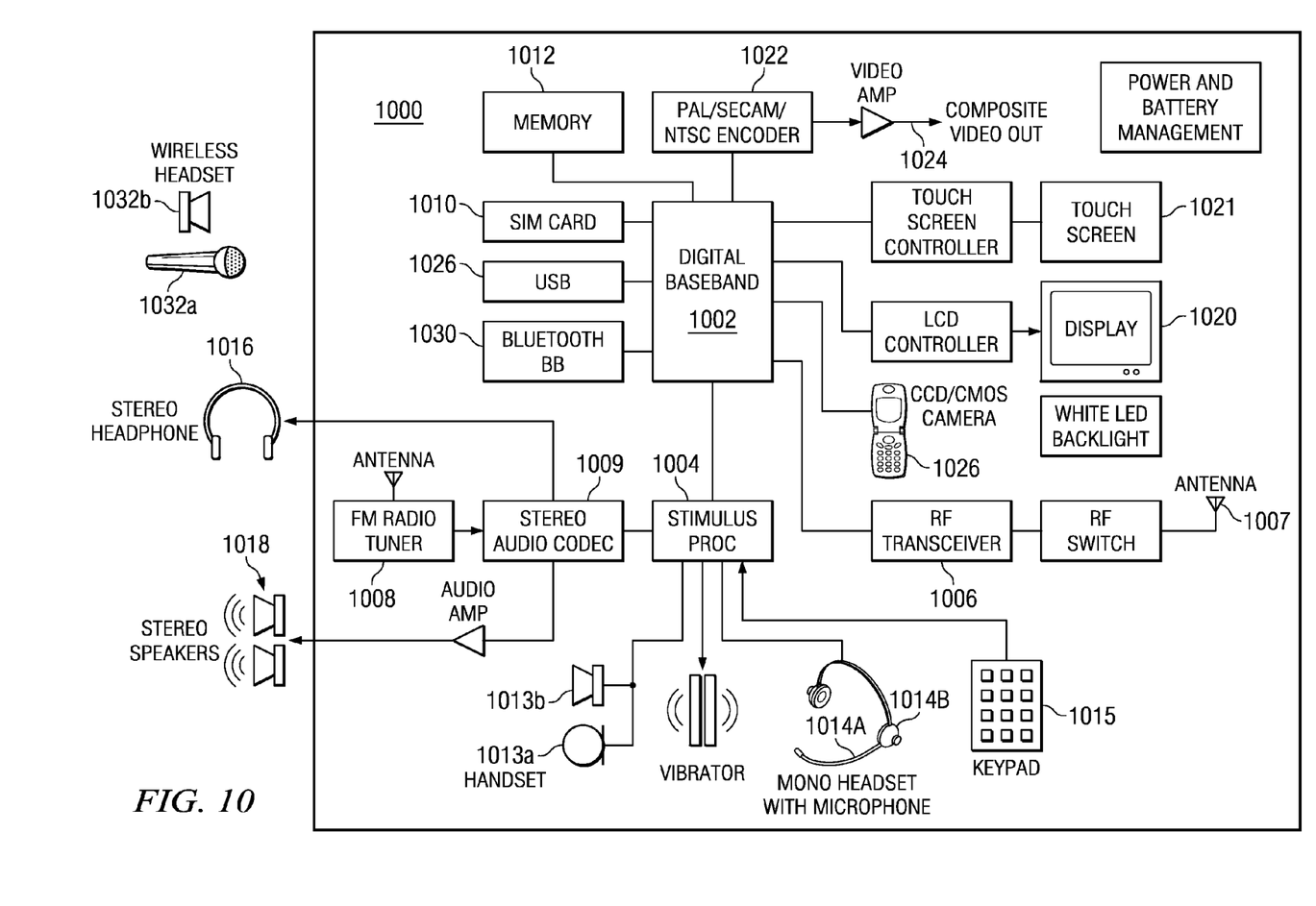
FIG. 10 is a block diagram of a cellular phone for use in the network of FIG. 1.

FIG. 10 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013*a* and sends a voice data stream to handset mono speaker 1013*b*. SP unit 1004 also receives a voice data stream from microphone 1014*a* and sends a voice data stream to mono headset 1014*b*. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

When no data is expected for transmission, the DBB places transceiver 1006 in a low power DRX mode. While in DRX mode, the transceiver is not required to monitor downlink control message from a serving eNB, nor does it send to the eNB. While in DRX mode, the DBB may detect an event that requires an SRI be sent to the eNB. As descried above with reference to FIGS. 1-8, the uplink logic encodes the SRI with piggy-back data that tells the eNB the reason for sending the SRI while the UE device is in DRX mode. For example, low latency data may need to be transmitted, or a TA update may be needed to maintain synchronization with a serving eNB.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description.

It is therefore contemplated that the appended claims will cover any such modifications of the embodiments as fall within the true scope and spirit of the invention.

What is claimed is:

1. A method for transmission in a cellular network between a user equipment (UE) and a base station (eNS), comprising:
   entering a low power mode (DRX) having silent intervals during which the eNS does not expect to receive a transmission from the UE and the UE is not required to monitor DL control channels from the eNS;
   detecting occurrence of an event at the UE while in DRX mode; and
   transmitting a scheduling request indicator (SRI) to the eNS in response to detection of the event, wherein the SRI contains information identifying the event type.

2. The method of claim 1, wherein the SRI is transmitted during a silent interval.

3. The method of claim 1, wherein the event is detected during the silent interval.

4. The method of claim 1, wherein the information contained in the SRI is limited to one or two bits.

5. The method of claim 1, wherein the information contained in the SRI identifies an event type selected from a plurality of pre-defined event types.

6. The method of claim 1, wherein the information contained in the SRI identifies an event type selected from a group consisting of a timing adjustment (TA) request, a buffer status, an uplink resource size selection among a pre-defined set, an event-triggered measurement report, and a DRX status after uplink transmission on PUSCH.

7. The method of claim 1, further comprising receiving a response to the SRI from the eNS, wherein the response is selected to be in accordance with the identified event type.

8. A user equipment (UE) for use in a cellular network, comprising:
   means for entering a low power mode (DRX) having silent intervals during which a base station (eNS) serving the UE does not expect to receive a transmission from the UE and the UE is not required to monitor DL control channels from the eNS;
   means for detecting occurrence of an event at the UE while in DRX mode; and
   means for transmitting a scheduling request indicator (SRI) to the eNS in response to detection of the event, wherein the SRI carries information identifying the event type.

9. The UE of claim 8, wherein the information contained in the SRI identifies an event type selected from a plurality of pre-defined event types.

10. The UE of claim 8, wherein the information contained in the SRI identifies an event type selected from a group consisting of a timing adjustment (TA) request, a buffer status, an uplink resource size selection among a pre-defined set, an event-triggered measurement report, and a DRX status after uplink transmission on PUSCH.

11. The UE of claim 8, further comprising means for receiving a response to the SRI from the eNS, wherein the response is selected to be in accordance with the identified event type.

12. A cellular telephone for use in a cellular network, comprising:
   a receiver connected to an antenna operable to receive information from a base station (eNS) within a given cell that provides information via a downlink (DL) channel and reference signal for synchronizing transmission from the cellular telephone to the eNS serving the cellular telephone;
   a processor connected to a storage memory holding instructions for execution by the processor and coupled to the receiver, wherein the processor is operable to place the cellular telephone in a low power mode (DRX) having silent intervals during which the cellular telephone is not required to monitor the DL control channel and is not expected to transmit data to the serving eNS;
   an event detection module coupled to the processor operable to detect occurrence of an event while the cellular telephone is in DRX mode and operable to select an event type for the detected event; and
   a transmitter coupled to the processor operable to transmit a scheduling request indicator (SRI) from the cellular telephone to the serving eNS in response to detection of an event, wherein the SRI includes data piggy-backed on the SRI identifying the event type.

13. The cellular telephone of claim 12, wherein the SRI is transmitted during a silent interval.

14. The cellular telephone of claim 12, wherein the event is detected during the silent interval.

15. The cellular telephone of claim 12, wherein the data piggy-backed on the SRI is limited to one or two bits.

16. The cellular telephone of claim 12, wherein the data piggy-backed on the SRI identifies an event type selected from a plurality of pre-defined event types.

17. The cellular telephone of claim 12, wherein the data piggy-backed on the SRI identifies an event type selected from a group consisting of a timing adjustment (TA) request, a buffer status, an uplink resource size selection among a pre-defined set, an event-triggered measurement report, and a DRX status after uplink transmission on PUSCH.

18. The cellular telephone of claim 12, wherein the receiver is operable to receive a response to the SRI from the eNS, wherein the response is selected to be in accordance with the identified event type.

19. A method for transmitting from user equipment (UE) to base stations (eNS) in a cellular network, comprising:
  establishing a set of event types that may occur during a silent period when a UE is in low power mode (DRX) mode within the cellular network;
  placing a UE in DRX mode, during which the eNS does not expect to receive a transmission from the UE and the UE is not required to monitor DL control channels from the eNS; and
  receiving at the eNS a scheduling request indicator (SRI) transmission from the UE while the UE is in DRX mode, wherein the SRI contains piggy-back data indicating a type of event whose occurrence was detected by the UE while in DRX mode.

20. The method of claim 19, further comprising transmitting control information from the eNS to the UE in accordance with the type of event indicated by the piggy-back data.

21. The method of claim 20, wherein the control information transmitted to the UE is selected from a group consisting of a timing adjustment command, an uplink grant, an uplink resource size selection among a pre-defined set, and an uplink grant tailored for a measurement report.

* * * * *